M. L. STOUT
STOVE SCRAPER.
APPLICATION FILED JUNE 11, 1920.

1,402,975. Patented Jan. 10, 1922.

Inventor.
Mary L. Stout

UNITED STATES PATENT OFFICE.

MARY L. STOUT, OF PORTLAND, OREGON.

STOVE SCRAPER.

1,402,975.  Specification of Letters Patent.  Patented Jan. 10, 1922.

Application filed June 11, 1920. Serial No. 388,326.

*To all whom it may concern:*

Be it known that I, MARY L. STOUT, a citizen of the United States, residing at Portland, in the county of Multnomah and State of Oregon, have invented a new and useful Stove Scraper, of which the following is a specification.

My invention relates to improvements in scrapers, such as are used in cleaning out soot from the bottom of any ordinary cooking stove, range or heater, or to remove ashes therefrom.

The object of my invention is to produce a scraper which may be cheaply built; which is strong and durable; will perform the usual services of a scraper; and will facilitate the cleaning out of stoves by gathering and holding compactly the ashes and soot until dropped into a receptacle, thereby overcoming the difficulty of soot and ashes being drawn back into the stove by draught, when the scraper is being drawn forward.

Figure 1:
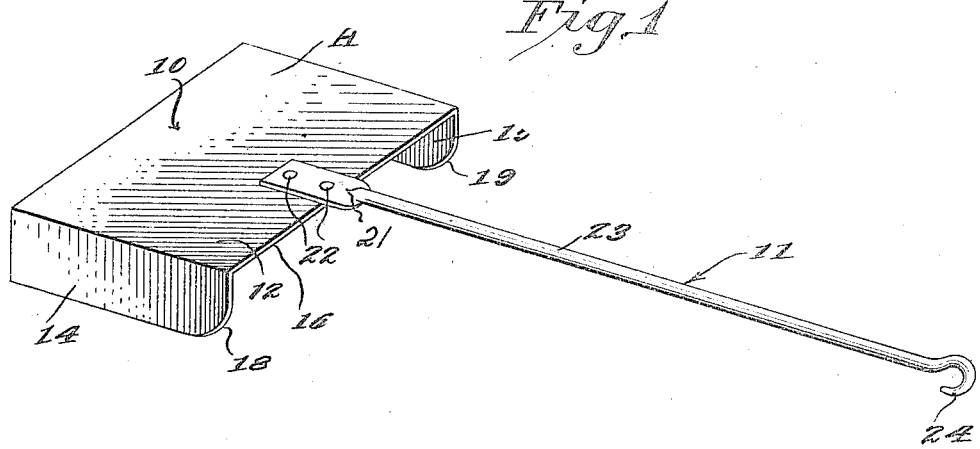

In the drawing, wherein similar reference characters designate corresponding parts throughout the several views, Fig. 1 is a perspective view of the scraper.

Figure 2:
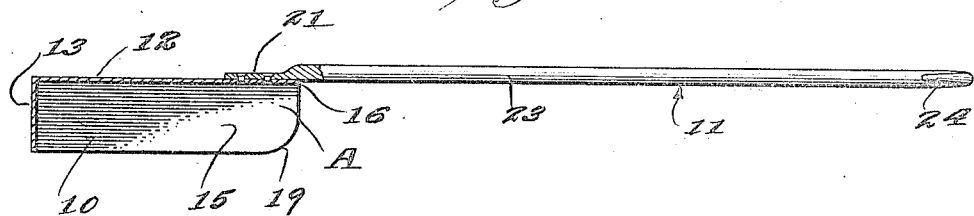

Fig. 2 is a sectional view.

In the drawings, wherein for the purpose of illustration is shown the preferred embodiment of my invention, the letter A designates the improved scraper, including a pan 10, and handle 11.

The pan 10, is of peculiar formation, comprising a flat substantially rectangular top portion 12, and having a forward end 13 and sides 14 and 15 depending therefrom at right angles. It is preferred, that the front or scraping edge 13, and sides 14 and 15 be of the same height, and integrally connected together, and to the marginal front and side edges of the rectangular top 12. The pan 10 may be stamped from sheet material, as a matter of economy, cast solid, or assembled in parts, to conform to the shape herein specified.

The rear marginal edge 16 of the rectangular top 12, is free from any depending portions, to provide a convenient entrance for foreign matter, such as soot, when the pan is used for scraping purposes.

The rear edges 18 and 19, of the sides 14 and 15 respectively, adjacent the rear edge 16 of the top 12, are arcuated, or rounded downwardly from the marginal edge 16, to provide an effective arrangement, whereby the scraper may move over projections, ridges, and the like.

The handle 11, is preferably straight, including an end flat portion 21, which is riveted as at 22 on the upper surface of the top 12, and centrally of the width thereof. It is preferred, that the handle 11 be riveted adjacent the rear entrance margin 16, and projecting rearwardly in a circular body portion 23; said handle 11 extending parallel to the plane defined by the top 12. A hook 24, or the like, may be provided upon the extreme outer end of the handle 11, for purposes of supporting the scraper when not in use.

The scraper is primarily adapted for use in cleaning out ashes and soot, which remain around the sides and back of the interior of the stove, after the ash pan has been removed. The peculiar formation of the pan 10, insures the ashes and soot being retained therein, and prevented from being drawn back into the stove by draught.

Various changes in the shape, size, and arrangement of parts may be made to the form of the scraper herein shown and described, without departing from the spirit of the invention or the scope of the claims.

I claim:

1. A scraper, comprising in combination, a top, a depending forward end, and depending sides all of substantially the same height, the rear edge of said top remaining free of depending portions to provide an entrance to said scraper, and a handle on said scraper.

2. A scraper, comprising a substantially rectangular structure including a top having forward and side depending flanges attached thereto, and a handle extending rearwardly from the container and in substantially parallel alignment with the plane defined by said top.

3. A scraper, comprising in combination a substantially rectangular structure, including a flat rectangular top having the forward and side marginal edges provided with flanges depending therefrom substantially at right angles thereto, and having its rear marginal edge unobstructed by flanges to provide an entrance to said scraper, the rear edges of said side flanges adjacent said rear marginal edge of said top being arcuated downwardly to provide riding surfaces, and a handle extending rearwardly from the upper surface of said top, and substantially parallel to the plane defined by said top.

MARY L. STOUT.